Aug. 19, 1969   R. W. GARDINER ET AL   3,461,725
ELECTRIC DIFFERENTIAL PRESSURE TRANSMITTER
Filed Aug. 18, 1967   2 Sheets-Sheet 1
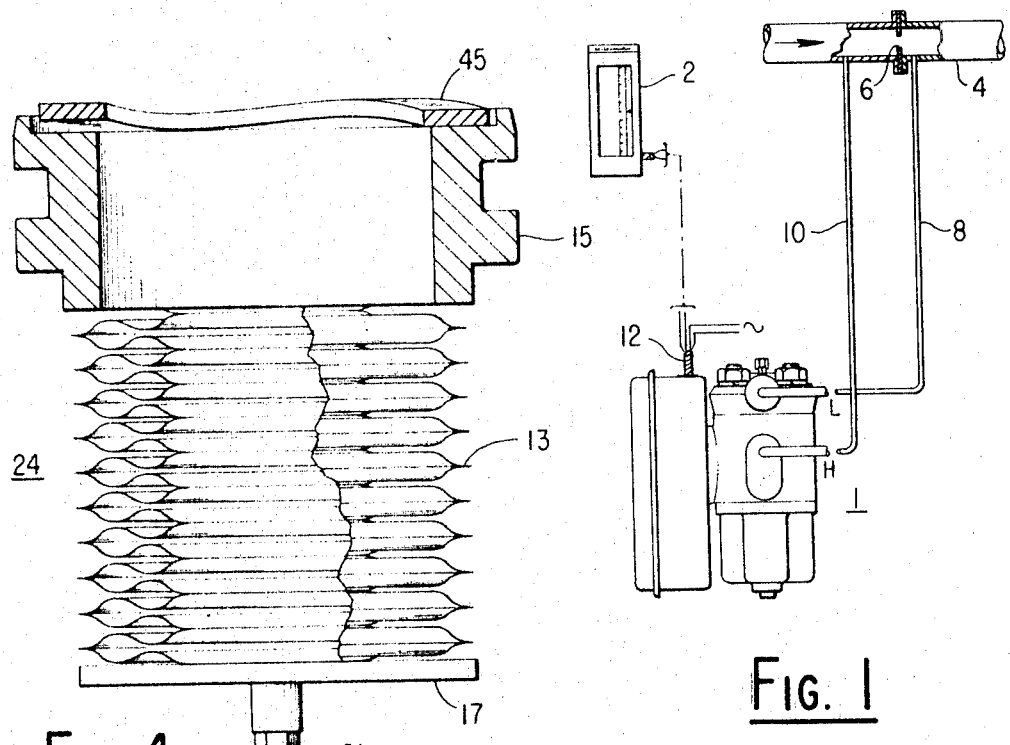
FIG. 1
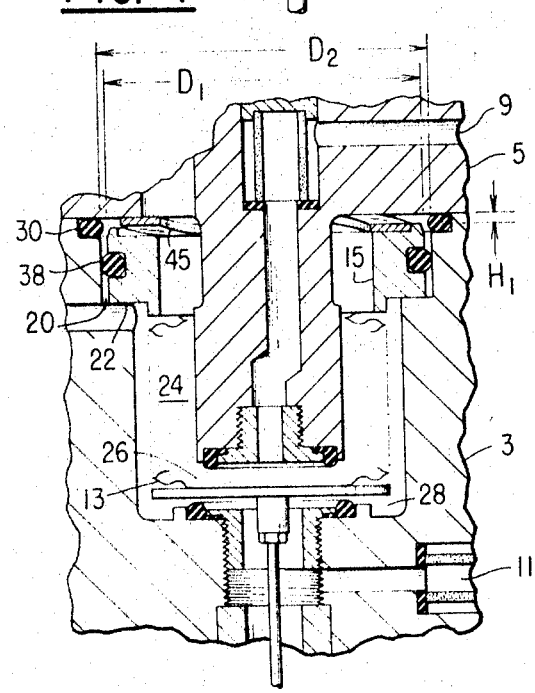
FIG. 4
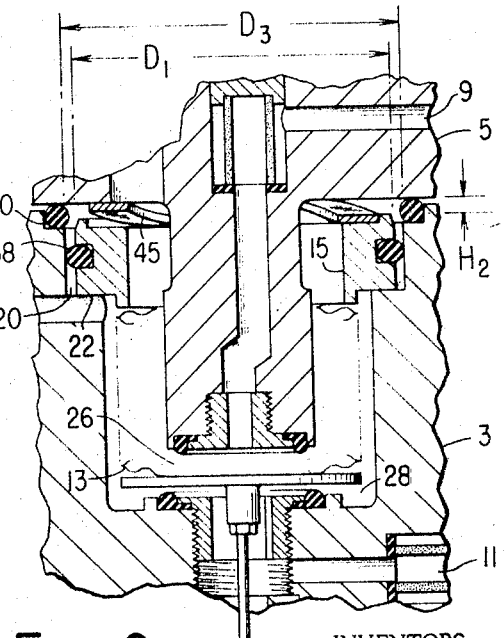
FIG. 5
FIG. 6
INVENTORS
ROY W. GARDINER
VICTOR J. MELVILLE
NORMAN J. YAGER
BY John F. Luhrs
ATTORNEY

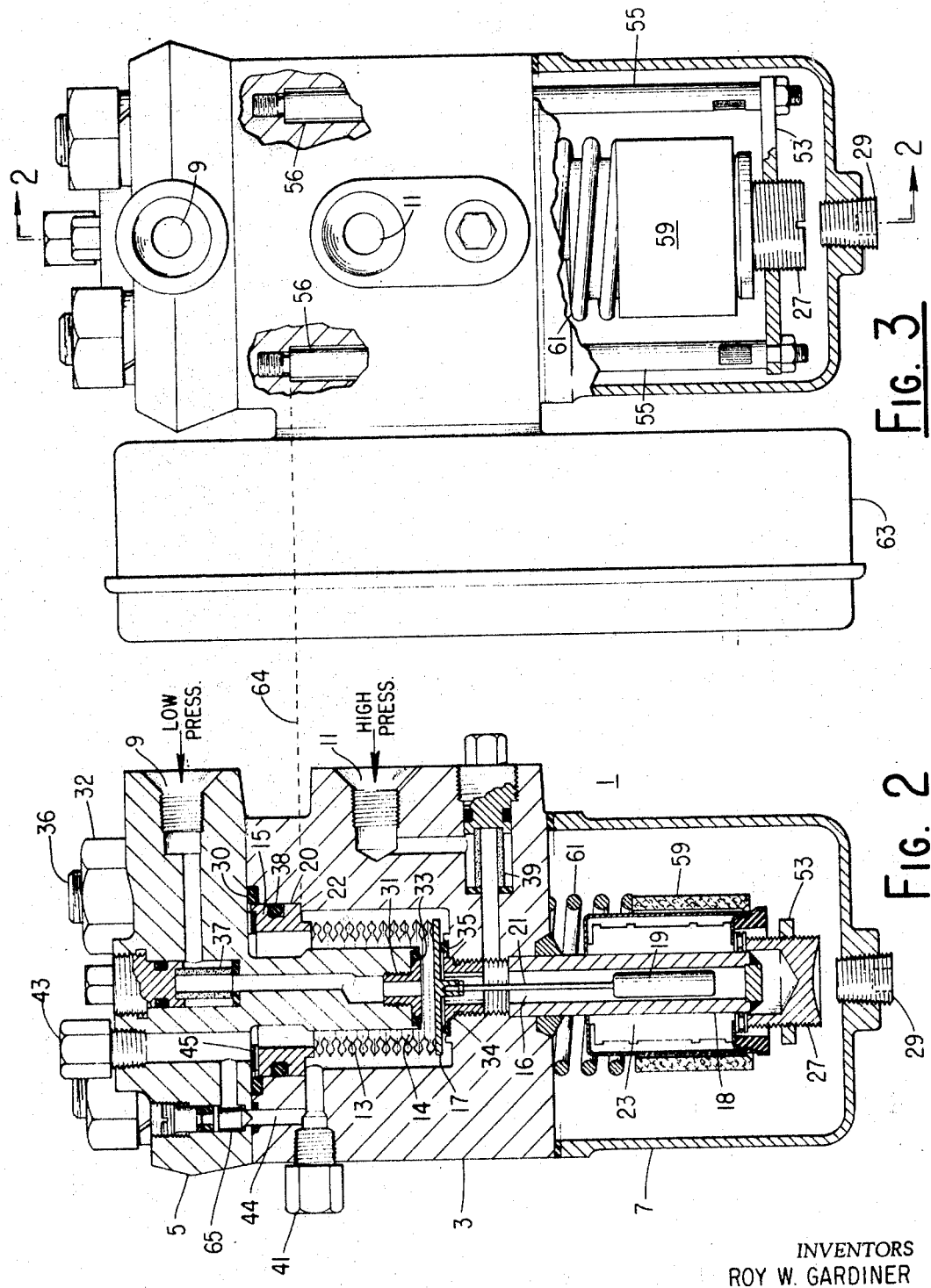

United States Patent Office 3,461,725
Patented Aug. 19, 1969

3,461,725
ELECTRIC DIFFERENTIAL PRESSURE TRANSMITTER
Roy W. Gardiner, Richmond Heights, and Victor J. Melville and Norman J. Yager, Euclid, Ohio, assignors to Bailey Meter Company, a corporation of Delaware
Filed Aug. 18, 1967, Ser. No. 661,609
Int. Cl. G01l 9/00
U.S. Cl. 73—393                    12 Claims

ABSTRACT OF THE DISCLOSURE

An apparatus for measuring pressure differential has a welded metal bellows sensor responding to pressure differential and a movable core transformer producing a proportional electrical signal. The bellows sensor has a collar on the open end thereof which is affixed within the housing of the apparatus by means of a spring in the form of a wavy washer to compensate for changes in static pressure and ambient temperature.

CROSS REFERENCES TO RELATED APPLICATIONS

J. C. Martin, Ser. No. 665,001, filed Sept. 1, 1967.

BACKGROUND OF THE INVENTION

This invention relates to a device for measuring differential pressures, more particularly to a differential pressure transmitter for generating an electric signal proportional to differential pressure.

*Field of the invention*

Differential pressure measuring devices have numerous industrial applications. For example, such devices are commonly used to measure the differential produced by a fluid flowing through a primary element such as an orifice, flow nozzle or venturi tube. Currently, such devices are designed with the intention that one device can be applied to any one of many applications. This design philosophy ordinarily results in the design of a device which, due to its intended general application, fails to provide the overall accuracy and compensation required in each specific application.

*Description of the prior art*

The complexity of the general purpose design of conventional differential pressure responsive devices creates conditions which reduce the accuracy of the device by producing output signal variations independent of differential pressure variation. Two such conditions are the influence of ambient temperature and static pressure on the output signal of the differential pressure responsive device. The ambient temperature sensitivity of many conventional devices results from the use of an incompressible fluid filled system, said fluid volume varying with changes in ambient temperature and structural expansion due to change in ambient temperature. The static pressure sensitivity of said devices results from the deformation of the housing.

SUMMARY OF THE INVENTION

The electric differential pressure transmitter which is the subject of our invention consists basically of a welded metal bellows responsive to pressure differentials and a movable core transformer acting as a transducer to convert bellows motion into an electrical signal proportional to pressure differential. The structure of the transmitter is such that the effect of housing deformation due to changes in static pressure is substantially eliminated. The structure design also provides mechanical means for referencing the welded bellows assembly and the movable core transformer to a common plane in the housing thus reducing the effect of fluctuations in ambient temperature.

BRIEF DESCRIPTION OF THE DRAWING

FIG. 1 illustrates a typical application of a transmitter used to measure rate of flow.
FIG. 2 is a sectioned elevation of the electric differential pressure responsive device along the line 2—2 of FIG. 3.
FIG. 3 is a partially sectioned side elevation of the electric differential pressure responsive device.
FIG. 4 is a sectioned elevation of a bellows assembly.
FIGS. 5 and 6 are functional illustrations of the bellows assembly mounting structure.

DESCRIPTION OF THE PREFERRED EMBODIMENT

Referring to FIG. 1, we show a typical pressure measuring system in which our electric differential pressure transmitter 1 responds to the pressure differential across an orifice plate 6 produced by fluid flow through a pipe 4. The differential pressure across orifice plate 6 is transmitted to the electric differential pressure responsive device 1 by means of pipes 8 and 10. The transmitter 1 converts the differential pressure sensed across the orifice plate 6 into an electrical signal which is transmitted to a recorder 2 by means of a cable 12. FIGS. 2 and 3 are sectional illustrations of the transmitter 1 to which the following discussion will refer.

The structure of the transmitter 1 includes a bellows assembly housing 3, a housing cover 5 and a transducer housing 7. Process fluid from pipes 8 and 10 of FIG. 1 enters the device 1 through inlets 9 and 11 respectively. The process fluid that enters inlets 9 and 11 is filtered by filters 37 and 39 respectively. These porous, Inconel filters provide a means of protecting a welded metal bellows sensor 13 by dampening pressure surges as well as preventing scale and sediment from depositing on the bellows surface and restricting bellows response. Process fluid passing through filter 37 fills the internal volume of bellows 13 as well as filling the volume provided by clearance between bellows collar 15 and housing cover 5 and the passageway provided for vent 43. Process fluid passing through filter 39 fills the volume established by the exterior surface of the bellows 13 and bellows end plate 17 and the internal surface of the housing 3 as well as filling volume 16 of non-magnetic tube 18.

As the differential pressure across orifice plate 6 changes, the differential pressure between ports 9 and 11 will also change thus causing a change in pressure differential across bellows 13. The change in pressure differential across bellows 13 will cause the bellows to expand or contract depending on the polarity of the change in pressure differential. The bellows movement is transmitted by bellows end plate 17 to the core 19 of a movable core transformer 23 by means of connecting rod 21. This core provides inductive coupling between the primary and secondary windings of the movable core transformer thereby producing a voltage change proportional to differential pressure. The output voltage is subsequently demodulated and amplified in an amplifier which may be conveniently mounted in a housing such as the housing 63 of FIG. 3 to a level suitable for use with conventional recorders, indicators, controllers, data logging systems and the like. One type of circuit for conditioning the output signal is disclosed in copending application of J. C. Martin, Ser. No. 665,001, filed in the United States Patent Office on Sept. 1, 1967.

The bellows 13 is constructed by a welding process which produces a bellow superior to that produced by the conventional hydraulic forming process. The welded metal bellows 13 preferably consists of convoluted metal diaphragms welded in series at the inside edge to form convolutions. A series of convolutions are stacked and welded at the outer edges to form a bellows of the opposed cantilever type. The end fittings, represented by collar 15 and end plate 17, are welded to the bellows to form the final assembly. A welded bellows of this type is disclosed and claimed in E. R. Thompson, Sr., United States Patent 2,925,829.

Materials for fabricating the welded bellows can be any weldable metals and are selected on the basis of strength required, corrosion resistance, ease of fabrication and availablility. The conventional hydroform bellows require ductile material for fabrication, thus limiting the strength, corrosion resistance and other desirable qualities of the bellows.

The welded bellows, however, is not so restricted in the selection of material since the contours of each bellows diaphragm section are formed with the material in an annealed condition. After the diaphragms are formed and welded together, the bellows is heat treated. The heat treated material then exhibits the high strength properties required for good accuracy and the spring rate of the bellows is sufficiently stable, controllable and linear that the bellows itself may be used to produce the force opposing the differential pressure.

Seal bushings 31 and 34, illustrated in FIG. 2, are located on either side of bellows end plate 17 and by means of elastomeric cup seals 33 and 35 mounted thereon, provide full over range protection of bellows 13 by limiting the movement of the end plate 17 in response to excessive differential pressure in either direction and sealing off the discharge of fluid from the chamber of lower pressure.

The pressure within and without the bellows assembly can be equalized by means of an equalizing valve 65 located in cover 5 and controlling passage of fluid through passageway 44.

The bellows assembly 24 illustrated in detail in FIG. 4, consisting of collar 15, welded metal bellows 13 and end plate 17 is housed entirely within the cavity produced by bellows assembly housing 3. The bellows collar 15 fixes one end of the bellows assembly in housing counter bore 20 while end plate 17 is free to move in response to changes in differential pressure. FIG. 4 also illustrates the opposed cantilever design of welded bellows 13. The opposed cantilever design of the bellows diaphragm sections minimizes the change in mean effective area of bellows 13 during a change in differential pressure thus providing linear bellows response to changes in differential pressure. Bellows motion in response to variation in differential pressure is transmitted to core 19 by bellows end plate 17 acting through connecting rod 21. A bellows reference is established by inserting bellows collar 15 into counter bore 20 as depicted in FIG. 2, and bottoming said collar in said counter bore by means of wave washer 45 held in compression between collar 15 and housing cover 5.

The method of locating the bellows assembly 24 in counter bore 20 reduces the output error caused by mechanical motion produced by changes in static pressure. Static pressure effect is the change in output signal in response to a change in static pressure to ports 9 and 11. By housing the bellows assembly 24 entirely within housing 3, the effect of static pressure deflections of bellows housing 3 and housing cover 5 on bellows 13 is reduced and through the use of wave washer 45, the effect is all but eliminated. The function of wave washer 45, depicted in FIG. 4, which acts as a spring, is to pre-load the bellows collar 15 such that the deflection of cover 5 caused by significant changes in static pressure will not lift the collar 15 off the bottom of counter bore 20. As cover 5 deflects outwardly due to an increase in static pressure, the wave washer 45 expands, reducing the pre-load on bellows collar 15, but retaining sufficient spring load to maintain bellows collar 15 in fixed position in counter bore 20. This technique also isolates the bellows collar 15 from any radial deflection of housing 3.

Referring to FIGS. 5 and 6, we show the stabilizing effect of the counter bore position of bellows collar 15 and the application of wave washer 45. It is assumed that a static pressure of $P_1$ is applied to the bellows assembly 24 sensing chambers 26 and 28 through inlets 9 and 11 respectively. Under this condition, the outside diameter of bellows collar 15 is designated $D_1$, the diameter of counter bore 20 is $D_2$ and the vertical distance between housing cover 5 and bellows collar 15 is $H_1$.

Assuming now the static pressure applied to the bellows sensing chambers 26 and 28 is increased from $P_1$ to $P_2$ as depicted in FIG. 6, it will be noted that the resulting bellows housing 3 expansion has increased the counter bore diameter to $D_3$ while the vertical movement of housing cover 5 caused by increased static pressure $P_2$ will increase the spacing between collar 15 and cover 3 from a value $H_1$ to a value $H_2$. As noted previously, wave washer 45 will expand to compensate for the increase in vertical distance from $H_1$ to $H_2$ while maintaining the bellows collar in the bottomed reference position in counter bore 20. Furthermore, the counter bore reference position of collar 15 wherein the collar 15 merely contacts the counter bore shoulder 22 allows radial expansion of housing 3 due to increase in static pressure without affecting the diameter $D_1$ of bellows collar 15.

Notwithstanding the relative movement between housing 3 and cover 5 with changes in static pressure, a pressure-tight seal is maintained therebetween by an O-ring gasket initially pre-loaded and deformed as shown in FIG. 5 a predetermined amount when the cover 5 is clamped against housing 3 by means of nuts 32 threaded on studs 36 (FIGS. 2 and 3) which are secured in the housing 3. Similarly, a pressure-tight seal is maintained between chambers 26 and 28 with varying static pressure by means of O-ring gasket 38. The differences between $H_1$ and $H_2$, and $D_2$ and $D_3$ shown in FIGS. 5 and 6 have been exaggerated for purposes of illustration; nevertheless, when it is considered that a differential pressure transmitter such as forms the subject matter of our invention is designed to maintain an accuracy in the order of ±¼% over a static pressure range of from 0 to upwards of 6000 p.s.i. or more, the dimensional changes to which we have alluded become significant.

It is also apparent that the construction, while minimizing the effects of housing distortion due to changes in ambient pressure and/or temperature also provides for easy and simple assembly and disassembly. It will be noted that the bellows assembly is not fastened to the housing 3, but is merely held therein in proper vertical location by means of wave washer 45 bearing against cover 5 and collar 15. Similarly, O-ring gasket 38 properly centers collar 15 is housing 3, without the use of fasteners, dowel pins or the like.

Referring to FIG. 3, we show movable core transformer assembly 59 as being positioned by a support structure consisting of retainer plate 53, mounting studs 55 and adjusting screw assembly 27. Adjusting screw assembly 27, which is threaded in retainer plate 53, which in turn is held stationary by mounting studs 55, positions movable core transformer assembly 59. Retainer spring 61 loads one end of assembly 59 so as to maintain the opposite end of assembly 59 in contact with screw assembly 27 thus insuring positive positioning of assembly 59 by rotation of adjusting screw 27. Adjusting screw assembly 27 provides a zero adjustment during calibration of the movable core transformer.

Studs 55 pass freely through bores 56 in housing 3 and are referenced in housing 3 at a plane common to the reference of bellows collar 15 in counter bore 20, as shown by the dash line 64 running between FIGS. 2 and 3. These design considerations which provide the common reference for both the sensing bellows 13 and the movable core transformer assembly 59 insure negligible relative motion between the core 19 and windings 23 due to changes in static pressure. Likewise, error resulting from expansion due to fluctuations in ambient temperature is minimized as a result of the common plane of reference. The relative displacement of core 19 with respect to windings 23 due to thermal expansion can be accurately calculated. The appropriate material for studs 55 can then be selected so as to reduce this relative displacement to a negligible value.

What we claim as new and desire to secure by Letters Patent of the United States is:

1. In a differential pressure transmitter, the combination comprising, a housing having a cylindrical bore provided with a flat-bottomed enlargement at one end, a welded metal bellows assembly in said bore having a collar resting on the flat bottom of said enlargement and a movable end, a cover plate for closing said flat-bottomed enlargement, means for clamping said cover plate to said housing and spring means positioned between said cover plate and the collar of said bellows assembly for pressing said collar against the flat bottom of said enlargement when said cover plate is clamped to said housing.

2. A differential pressure transmitter as claimed in claim 1 wherein the outer end of said flat-bottomed enlargement is provided with a counter bore and an O-ring gasket in said counter bore for providing a yieldable pressure-tight seal between said cover plate and said housing.

3. A differential pressure transmitter as claimed in claim 2 wherein said spring means is a wavy washer for holding said collar against the flat bottom of said enlargement as said cover plate and housing separate due to internal pressure within said housing.

4. A differential pressure transmitter as claimed in claim 3 wherein said collar is provided with a circumferential recess and an O-ring gasket in said recess for providing a yieldable pressure-tight seal between said collar and the wall of said flat-bottomed enlargement.

5. A differential pressure transmitter as claimed in claim 1 wherein said welded metal bellows is of the opposed cantilever design.

6. A differential pressure transmitter as claimed in claim 1 wherein the movable end of said bellows assembly positions the core of a differential transformer.

7. A differential pressure transmitter as claimed in claim 6 including means supporting said differential transformer from points in a plane common to a plane passing through the bottom of said flat-bottomed enlargement.

8. A differential pressure transmitter as claimed in claim 7 wherein said last named means comprises one or more metallic rods freely passing through bores in the wall of said housing, said one or more rods having a chemical composition to maintain the relative positions of said core and differential transformer constant under varying ambient temperatures.

9. A differential pressure transmitter comprising:
a housing having an interior chamber, a first and a second fluid pressure inlet, a passage in communication with said chamber and said first fluid inlet, and a passage in communication with said chamber and said second fluid inlet;
a cover for said housing;
a welded metal bellows having a movable end and a fixed end, said bellows mounted in said housing chamber at the fixed end of said bellows such that the interior of said bellows is in communication with the fluid pressure entering said first inlet and the exterior of said bellows is in communication with the fluid pressure entering said second fluid inlet;
an end plate attached at the periphery of the free-moving end of said bellows forming a fluid-tight seal therewith isolating communication between the interior and exterior of said bellows;
a movable core transformer mounted in said chamber, the core of said transformer attached to the bellows end plate such that the transformer produces an electrical output signal proportional to the movement of said bellows end plate;
a biasing means positioned between the fixed end of said bellows and said housing cover to isolate the bellows from adverse effects caused by change in static pressure and ambient temperature;
means for protecting said bellows from damage due to excess pressure difference between said inlet pressures;
a first filter means located in said first fluid inlet; and
a second filter means located in said second fluid inlet.

10. A differential pressure transmitter as claimed in claim 9 wherein said bellows biasing means is a wave washer acting in compression between the bellows collar and the housing cover such that said bellows collar is maintained in a bottomed position in said counter bore when said housing and housing cover react to changes in ambient temperature and static pressure.

11. A differential pressure transmitter as claimed in claim 9 wherein said bellows overpressure protection is provided by elastomeric surfaces located on either side of the bellows end plate such that the motion of said bellows end plate is restricted to a safe mechanical limit.

12. A differential pressure transmitter as claimed in claim 9 wherein said first and second filter means are comprised of porous Inconel filters positioned in said fluid inlets such that sediment and pressure surges are prevented from reaching the bellows.

References Cited

UNITED STATES PATENTS 3,053,281   9/1962   Taylor _____ 92—40 XR
3,289,479   12/1966  Tausch _____ 73—407

LOUIS R. PRINCE, Primary Examiner

DONALD O. WOODIEL, Assistant Examiner

U.S. Cl. X.R.

73—398, 407, 410; 92—34, 40